United States Patent
Stephens

(10) Patent No.: US 8,699,508 B2
(45) Date of Patent: *Apr. 15, 2014

(54) RESPONSE SCHEDULING FOR MULTIPLE RECEIVERS

(75) Inventor: Adrian P. Stephens, Cambridge (GB)

(73) Assignee: Intel Corporation, Santa Clara, CA (US)

(*) Notice: Subject to any disclaimer, the term of this patent is extended or adjusted under 35 U.S.C. 154(b) by 2844 days.

This patent is subject to a terminal disclaimer.

(21) Appl. No.: 10/969,689

(22) Filed: Oct. 19, 2004

(65) Prior Publication Data

US 2005/0135410 A1    Jun. 23, 2005

Related U.S. Application Data

(63) Continuation-in-part of application No. 10/740,648, filed on Dec. 18, 2003.

(51) Int. Cl.
H04L 12/413    (2006.01)

(52) U.S. Cl.
USPC ........ 370/445; 370/312; 370/346; 370/395.4; 370/432; 370/449

(58) Field of Classification Search
USPC ............. 455/412.1, 412.2, 413, 414.1, 414.2, 455/414.3, 432.3
See application file for complete search history.

(56) References Cited

U.S. PATENT DOCUMENTS

| | | | |
|---|---|---|---|
| 5,036,518 A | 7/1991 | Tseung | |
| 5,603,081 A | 2/1997 | Raith et al. | |
| 5,687,175 A | 11/1997 | Rochester, Jr. et al. | |
| 5,984,175 A | 11/1999 | Popp | |
| 6,021,137 A | 2/2000 | Kato et al. | |
| 6,122,483 A * | 9/2000 | Lo et al. | 455/12.1 |
| 6,282,187 B1 | 8/2001 | Evans | |
| 6,298,239 B1* | 10/2001 | Yonemoto et al. | 455/466 |
| 6,690,661 B1 | 2/2004 | Agarwal et al. | |
| 6,765,969 B1 | 7/2004 | Vook et al. | |
| 7,305,235 B2 | 12/2007 | Doi | |
| 7,362,799 B1 | 4/2008 | Petrus | |
| 7,738,912 B1* | 6/2010 | Hawkins et al. | 455/550.1 |
| 2002/0039912 A1 | 4/2002 | Yamaguchi et al. | |
| 2002/0058513 A1 | 5/2002 | Klein et al. | |
| 2002/0080816 A1* | 6/2002 | Spinar et al. | 370/449 |
| 2002/0093959 A1 | 7/2002 | Kaplan | |

(Continued)

FOREIGN PATENT DOCUMENTS

| | | |
|---|---|---|
| CA | 2373378 A1 | 11/2000 |
| CN | 1853374 A | 10/2006 |

(Continued)

OTHER PUBLICATIONS

International Search Report and Written Opinion from PCT/US2005/037167, mailed Mar. 6, 2006 (12 pgs).

(Continued)

*Primary Examiner* — Dai A Phuong

(74) *Attorney, Agent, or Firm* — Sutherland Asbill & Brennan LLP

(57) ABSTRACT

A base station poll mobile devices with the same multicast poll, and the polled mobile stations may respond separately at different times based on an assigned delay period for each mobile station that was specified in the poll message.

25 Claims, 7 Drawing Sheets

(56) References Cited

U.S. PATENT DOCUMENTS

| | | | |
|---|---|---|---|
| 2002/0106985 A1* | 8/2002 | Sato et al. | 455/3.01 |
| 2003/0045233 A1 | 3/2003 | Doi | |
| 2003/0078006 A1* | 4/2003 | Mahany | 455/63 |
| 2003/0142002 A1 | 7/2003 | Winner et al. | |
| 2003/0214933 A1* | 11/2003 | Margon | 370/342 |
| 2004/0058696 A1* | 3/2004 | Moon et al. | 455/507 |
| 2004/0190468 A1* | 9/2004 | Saijonmaa | 370/312 |
| 2004/0190469 A1* | 9/2004 | Pekonen et al. | 370/328 |
| 2005/0083691 A1 | 4/2005 | Jahn et al. | |
| 2005/0083961 A1* | 4/2005 | Pecen et al. | 370/432 |
| 2005/0136910 A1 | 6/2005 | Li et al. | |
| 2005/0285719 A1 | 12/2005 | Stephens | |
| 2007/0058975 A1 | 3/2007 | Sasai et al. | |
| 2007/0162810 A1* | 7/2007 | Sato et al. | 714/748 |
| 2007/0268983 A1 | 11/2007 | Elam | |
| 2012/0269107 A1* | 10/2012 | Palm et al. | 370/311 |

FOREIGN PATENT DOCUMENTS

| | | | |
|---|---|---|---|
| CN | 101032127 A | 9/2007 | |
| DE | 112005002295 T5 | 9/2007 | |
| EP | 0624007 | 11/1994 | |
| EP | 0776132 | 5/1997 | |
| EP | 0883320 | 12/1998 | |
| EP | 1652350 A1 | 5/2006 | |
| EP | 1766874 A1 | 3/2007 | |
| GB | 2433009 A | 6/2007 | |
| JP | 09312651 A * | 12/1997 | H04L 12/28 |
| JP | 2003-023428 A | 1/2003 | |
| JP | 2003-060655 A | 2/2003 | |
| JP | 2007-502074 A | 2/2007 | |
| KR | 10-2006-0052976 A | 5/2006 | |
| TW | 352204 A | 2/1999 | |
| TW | 453066 B | 9/2001 | |
| TW | 453071 B | 9/2001 | |
| TW | 563309 B | 11/2003 | |
| TW | I316352 B | 10/2009 | |
| WO | 00/72626 A1 | 11/2000 | |
| WO | 01/54302 A1 | 7/2001 | |
| WO | 01/71947 A1 | 9/2001 | |
| WO | WO 01/91415 A2 * | 11/2001 | H04L 29/06 |
| WO | WO 0228119 | 4/2002 | |
| WO | WO 2005/015844 | 2/2005 | |
| WO | 2006/044744 A1 | 4/2006 | |

OTHER PUBLICATIONS

Office Action received for Malaysian Patent Application No. PI 20043238, mailed on Jan. 23, 2008, 6 pages.

International Preliminary report on Patentability and Written Opinion received for PCT Patent Application No. PCT/US2004/025570, mailed on Feb. 23, 2006, 10 pages.

International Search Report and Written Opinion received for PCT Patent Application No. PCT/US2004/025570, mailed on Nov. 1, 2005, 16 pages.

Office Action received for Chinese Patent Application No. 200480026533.1, mailed on Feb. 29, 2008, 3 pages of English Translation Only.

Office Action received for Chinese Patent Application No. 200480026533.1, mailed on Feb. 20, 2009, 7 pages of English Translation and 15 pages of Chinese Office Action.

Office Action received for Chinese Patent Application No. 200480026533.1, mailed on Jul. 10, 2009, 1 page of English Translation and 17 pages of Chinese Office Action.

Office Action received for Malaysian Patent Application No. PI20043238, mailed on Jan. 6, 2009, 8 pages.

Office Action received for Taiwan Patent Application No. 94136159, mailed on Dec. 10, 2007, 1 page of English Translation Only.

Office Action received for Chinese Patent Application No. 200580033158.8, mailed on Jan. 9, 2009, 10 pages of English Translation and 5 pages of Chinese Office Action.

Office Action received for Chinese Patent Application No. 200580033158.8, mailed on Jul. 2, 2010, 6 pages of English Translation and 4 pages of Chinese Office Action.

Office Action received for Chinese Patent Application No. 200580033158.8, mailed on Jan. 4, 2012, 4 pages of English Translation and 5 pages of Chinese Office Action.

Office Action received for German Patent Application No. 112005002295.1, mailed on Dec. 14, 2011, 7 pages of English Translation Only.

Office Action received for United Kingdom Patent Application No. 0705992.6, mailed on Sep. 12, 2008, 4 pages.

Office Action received for U.S. Appl. No. 10/740,648, mailed on Nov. 29, 2005, 13 pages.

Office Action received for U.S. Appl. No. 10/740,648, mailed on Mar. 23, 2006, 23 pages.

Office Action received for U.S. Appl. No. 10/740,648, mailed on Jul. 13, 2006, 25 pages.

Office Action received for U.S. Appl. No. 10/740,648, mailed on Sep. 19, 2006, 13 pages.

Office Action received for U.S. Appl. No. 10/740,648, mailed on Feb. 20, 2007, 13 pages.

Office Action received for U.S. Appl. No. 10/740,648, mailed on Jul. 11, 2007, 15 pages.

Office Action received for U.S. Appl. No. 10/740,648, mailed on Dec. 26, 2007, 15 pages.

Office Action received for U.S. Appl. No. 10/740,648, mailed on Jun. 20, 2008, 18 pages.

Office Action received for U.S. Appl. No. 10/740,648, mailed on Nov. 25, 2008, 16 pages.

Office Action received for U.S. Appl. No. 10/740,648, mailed on Jun. 3, 2009, 12 pages.

Office Action received for U.S. Appl. No. 10/740,648, mailed on Nov. 24, 2009, 12 pages.

Office Action received for Chinese Patent Application No. 200580033158.8, mailed on Aug. 23, 2012, 4 pages of English Translation and 4 pages of Chinese Office Action.

International Preliminary Report on Patentability for PCT Patent Application No. PCT/US2005/037167, mailed on Mar. 6, 2006, 12 pages.

Office Action received for Malaysian Patent Application No. PI 20054875, mailed on Jan. 15, 2014, 4 pages.

* cited by examiner

RESPONSE SCHEDULING FOR MULTIPLE RECEIVERS

This application is a Continuation-In-Part of application Ser. No. 10/740,648, filed Dec. 18, 2003, and claims the priority of that filing date for all common subject matter.

BACKGROUND

Because of the ever-increasing use of wireless devices, the existing RF spectrum is becoming increasingly busy and crowded. As more and more devices try to share the same communications channels, the use of traditional communications protocols may cause the existing channels to reach the limits of their capacity, resulting in network congestion, communications delays, and sometimes even loss of service. For example, some communications protocols use a polling technique: a device that has data to transmit may wait until it is polled by a base station. After being given permission to transmit in the form of this poll, the device may transmit some or all of the data it has queued up for transmission. This polling technique may prevent multiple devices from trying to transmit at the same time and interfering with each other. However, if the responses are short, and numerous devices are being separately polled by the base station in this manner, the overhead of this polling protocol may use up a significant portion of the bandwidth, resulting in inefficient use of the channel. One technique for reducing the overhead consumed by this technique is to poll multiple devices in the same poll. However, this technique may create addition problems as multiple devices respond to the poll at the same time and thus interfere with each other.

BRIEF DESCRIPTION OF THE DRAWINGS

The invention may be understood by referring to the following description and accompanying drawings that are used to illustrate embodiments of the invention. In the drawings.

DETAILED DESCRIPTION OF THE INVENTION

Figure 1:
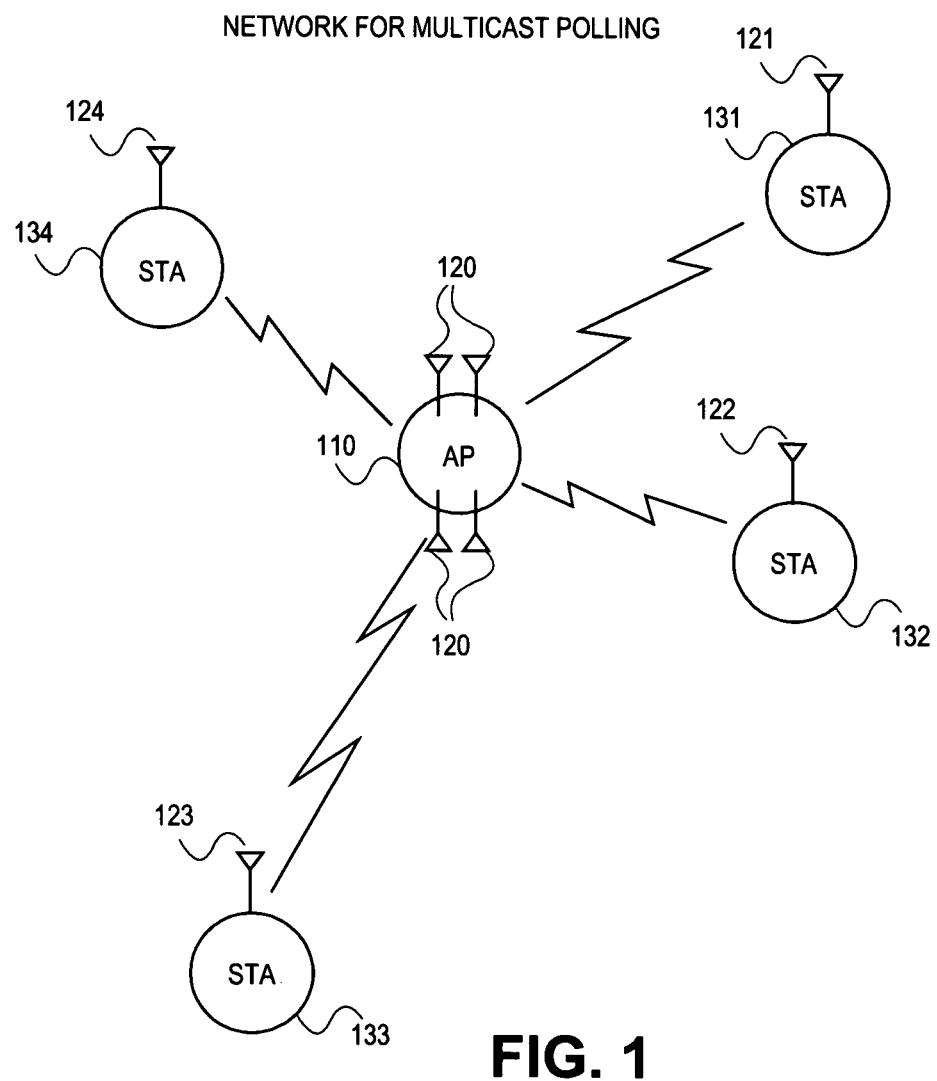
FIG. 1 shows a diagram of a communications network, according to an embodiment of the invention.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

The term "processor" may refer to any device or portion of a device that processes electronic data from registers and/or memory to transform that electronic data into other electronic data that may be stored in registers and/or memory. A "computing platform" may comprise one or more processors.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

In keeping with common industry terminology, the terms "base station", "access point", and "AP" may be used interchangeably herein to describe an electronic device that may communicate wirelessly and substantially simultaneously with multiple other electronic devices, while the terms "mobile device" and "STA" may be used interchangeably to describe any of those multiple other electronic devices, which may have the capability to be moved and still communicate, though movement is not a requirement. However, the scope of the invention is not limited to devices that are labeled with those terms.

In some embodiments of the invention, a base station may poll multiple mobile devices with a single transmission, with the mobile devices responding in a specified order after specified delays. A single transmission addressed to multiple devices may be referred to herein as a 'multicast' transmission, although the scope of various embodiments of the invention may not be limited to devices described with this term.

FIG. 1 shows a diagram of a communications network that may use multicast polls, according to an embodiment of the invention. A poll may be a request for the addressed device(s) to respond by transmitting data. For each addressed device, the poll may specify a delay for the addressed device to wait before responding, and the various delays may be specified by the base station so that the responding devices with not interfere with one another by transmitting at the same time. The illustrated embodiment of a network shows an AP 110 that may communicate with multiple STAs 131-134. Although AP 110 is shown with four antennas 120, other embodiments may have other arrangements (e.g., AP 110 may have one, two, three, or more than four antennas). Each STA may have at least one antenna, shown as 121-124, to communicate wirelessly with the AP 110. In some embodiments the STA antenna(s) may be adapted to operate omnidirectionally, but in other embodiments the STA antenna(s) may be adapted to operate directionally. In some embodiments the STAs may be in fixed locations, but in other embodiments at least some of the STAs may be moving during and/or between communications sequences. In some embodiments the AP 110 may be in a fixed location, but in other embodiments the AP 110 may be moving during and/or between communications sequences.

Figure 2:
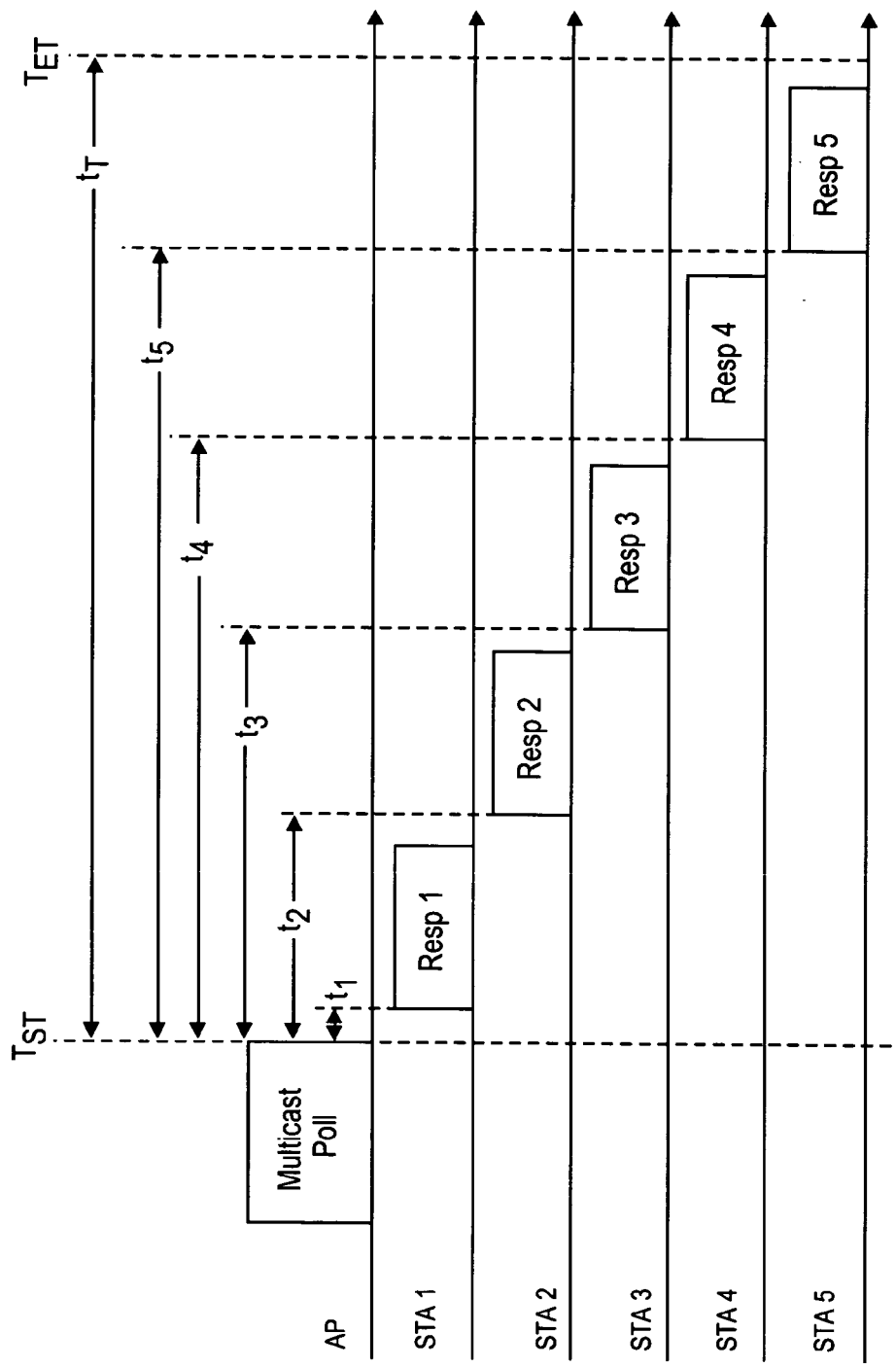
FIG. 2 shows a timing diagram of a communications sequence, according to an embodiment of the invention.

FIG. 2 shows a timing diagram of a communications sequence, according to an embodiment of the invention. By way of example, the illustrated embodiment shows 5 STAs, labeled STA1 through STA5, but the scope of the invention is not limited to this quantity. The AP may poll each STA in a group (e.g., in the illustrated embodiment a group consists of STA1-STA5), the poll requesting each of the selected STAs to send a response back to the AP. Each response may occur at a different time so that the responses from multiple STAs do not interfere with each other. In the illustrated embodiment, all five of the relevant STAs are polled in a single transmission by using a multicast transmission for a poll. A multicast transmission is addressed to multiple specific devices, each of which is expected to act upon the content of the transmission. This is in contrast to the more common singly-addressed transmission (addressed to a single specific device), or a broadcast (which may be intended to be acted upon by any devices able to receive it). In some embodiments the multicast poll may be sent omnidirectionally, so that all STAs within range may receive the poll, but only those that are addressed should respond to it, although the invention is not limited in this respect. Along with its individual address, each addressed STA may also receive an individual timing indicator directing the STA to wait for a particular time duration before responding with a response. In the illustrated embodiment of FIG. 2, the individual timing durations are shown as $t_1$ - $t_5$ for STA1-STA5, respectively. In some embodiments the timing indicator may be a simple ranking (e.g., 1, 2, 3, etc.) which the indicated STA may multiply by a time increment to determine how long to wait, but other embodiments may use other techniques (e.g., an indicator may be directly expressed in units of time; $t_1$, may unspecified but commonly understood to have a particular value, etc.). The time $t_T$ for the responses is shown in FIG. 2 as the time between the response start time ($T_{ST}$) and the response end time ($T_{ET}$). $T_{ST}$ may be set for any convenient point that is commonly understood by the AP and the addressed STAs, such as but not limited to the end of the poll.

The determination of which STAs to include in a poll may be determined by various factors. Each of the STAs may have previously established its presence with the AP, and may have provided information on its address, mode of wireless communication, possible data rates, etc. These and/or other factors may be considered by the AP in determining which STAs to place into the same poll group. If the AP does not receive a satisfactory response from a particular STA, that STA may be polled again (e.g., in another multicast poll with other STAs that may not have been included in the first poll).

Figure 3:
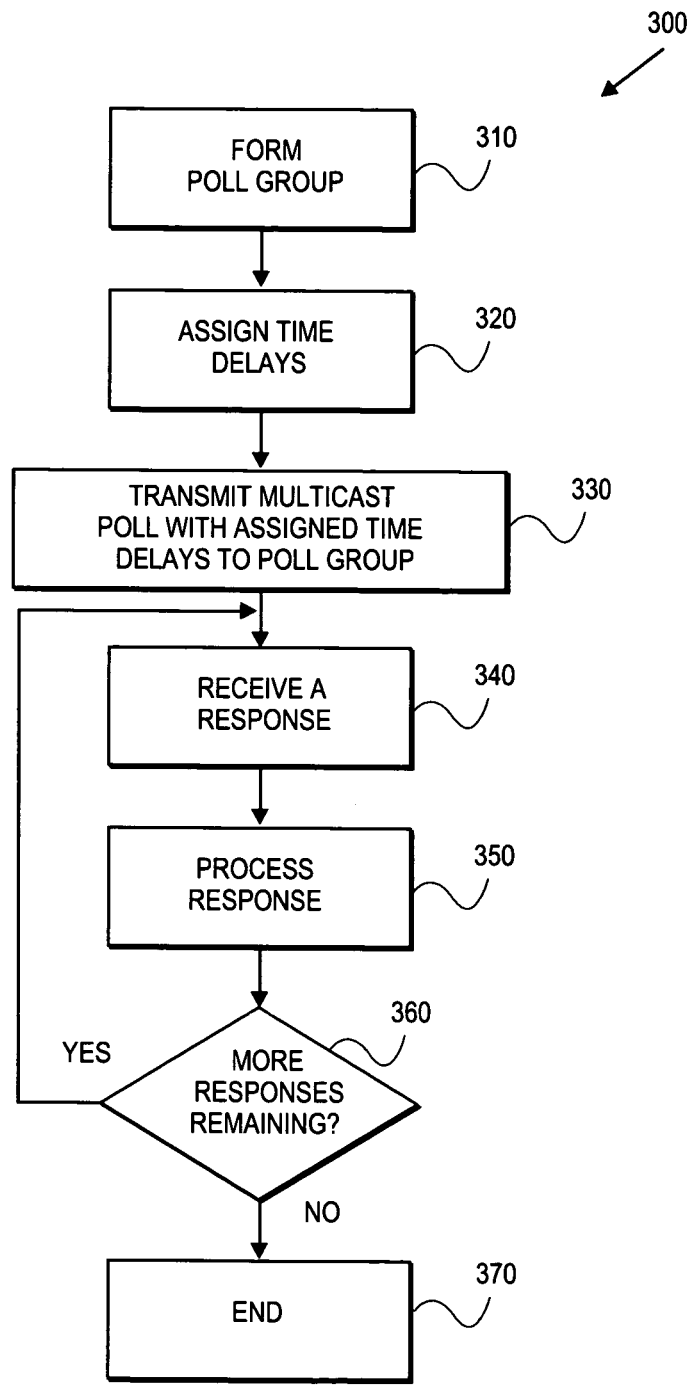
FIG. 3 shows a flow chart of a method of operation of a base station, according to an embodiment of the invention.

FIG. 3 shows a flow chart of a method of operation which may be performed by a base station, according to an embodiment of the invention. In flow chart 300, a poll group may be formed at 310. Various criteria may be used to determine which of the currently available STAs are to be associated with the particular poll group. For example, some STAs may already be known to be in a sleep mode or otherwise known not to have data to send, and those STAs might be excluded from the poll group in favor of other STAs.

After deciding which STAs to include in the group, at 320 the AP may assign a different time delay for each STA in the group. These time delays may be in any usable form, e.g., a direct time delay, a quantity of known increments of time, an ordinal ranking which can be multiplied by known increments of time, etc. In some embodiments, the time delays may be determined such that each device is allotted the same time to respond as the other devices, but in other embodiments different time delays may be allotted for each device, depending on various factors.

The time delays may also include time periods that are not expected to contain transmissions from the addressed devices. For example, the time delays may include a delay between the end of the poll and the beginning of the first response. This delay may be a short interframe space (SIFS), although various embodiments of the invention may not be limited in this manner. The time delays may contain a minimum delay time between any two consecutive responses, although various embodiments of the invention may not be limited in this manner. Such 'no-transmission' delays may be inserted for various reasons, such as allowing time for the various devices to process received information, transition between transmit and receive modes, etc. At 330 a multicast poll may be transmitted, containing the addresses of the STAs being polled, the time delays for the STAs being polled, and any other information deemed useful in the poll.

After the poll has been transmitted and the response period has begun, the AP may receive the first response at 340. At 350 the AP may process the received response and store the processed information for further processing at a later time. The amount of processing performed at this point may vary (e.g., digitizing the signal and storing it for further processing, calculating parameters, etc.).

If further responses are expected, as indicated at 360, the AP may return to 340 to receive the next response. The loop formed by 340, 350 and 360 may continue until all the STAs in the poll group have had time to respond, at which time this phase may end. If any of the polled STAs do not respond, or if the received response is not useable for its intended purpose (e.g., due to corrupted data), that STA may be polled again at a later time, possibly in another poll group. A maximum number of retries for such polls may be established, although the scope of various embodiments of the invention is not limited in this respect.

Figure 4:
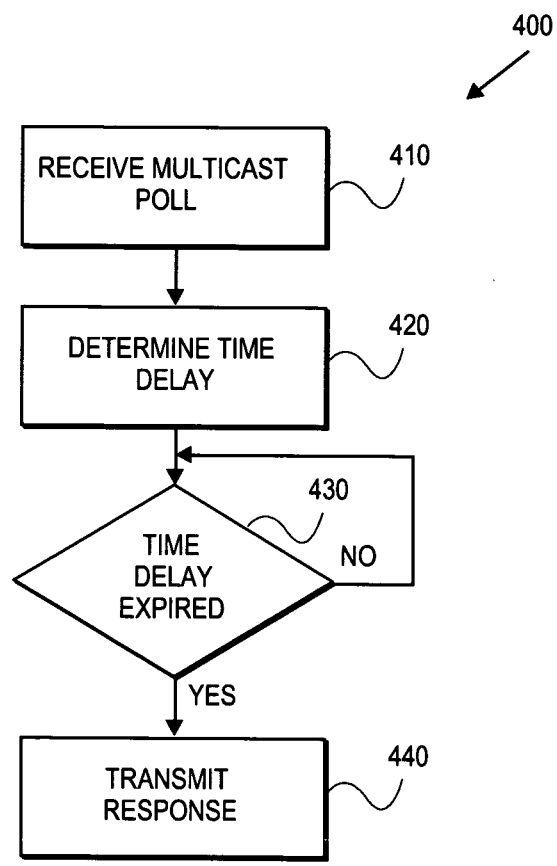
FIG. 4 shows a flow chart of a method of operation of a mobile device, according to an embodiment of the invention.

FIG. 4 shows a flow chart of a method of operation which may be performed by a mobile device, according to an embodiment of the invention. In flow chart 400, at 410 a multicast poll may be received, containing the address or other identifier of this mobile device. At 420 the timing indicator associated with this mobile device may be extracted from the multicast poll and a time delay may be determined from the timing indicator. At 430 the mobile device may wait until the time delay determined at 420 has expired. The time delay may be measured from any feasible staring point, as previously described. Upon expiration of the time delay, the mobile device may transmit its own response at 440.

Embodiments of the invention may be implemented in one or a combination of hardware, firmware, and software. Embodiments of the invention may also be implemented as instructions stored on a machine-readable medium, which may be read and executed by a processing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 5:
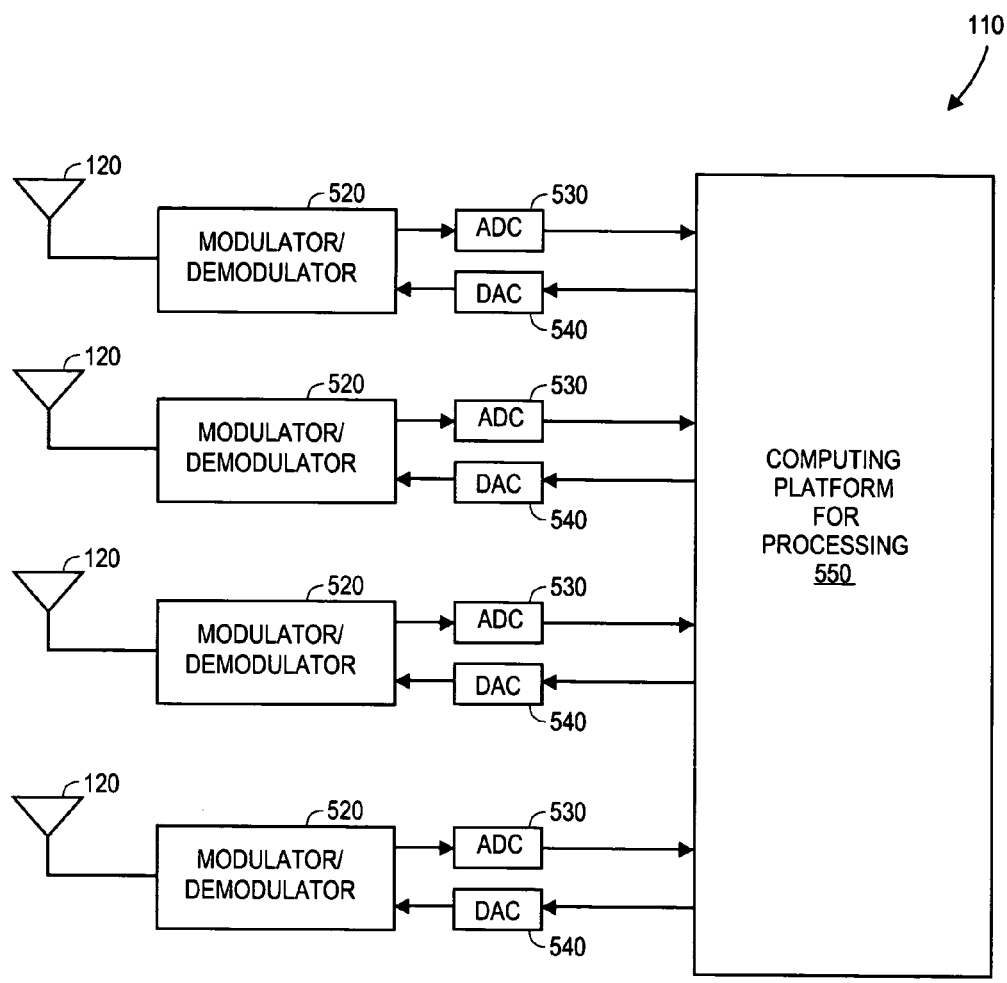
FIG. 5 shows a block diagram of a base station, according to an embodiment of the invention.

FIG. 5 shows a block diagram of a base station, according to an embodiment of the invention. Computing platform 550 may include one or more processors, and at least one of the one or more processors may be a digital signal processor (DSP). In the illustrated embodiment, AP 110 has four antennas 120, but other embodiments may have one, two, three, or more than four antennas. For each antenna, base station 110 may have a modulator/demodulator 520, an analog-to-digital converter (ADC) 530, and a digital-to-analog converter (DAC) 540. The combination of demodulator-ADC may convert received radio frequency signals from the antenna into digital signals suitable for processing by the computing platform 550. Similarly, the combination of DAC-modulator may convert digital signals from the computing platform 550 into radio frequency signals suitable for transmission through an antenna. Other components not shown may be included in the illustrated blocks as needed, such as but not limited to amplifiers, filters, oscillators, multiple DACs and/or ADCs where only one is shown, etc.

Figure 6:
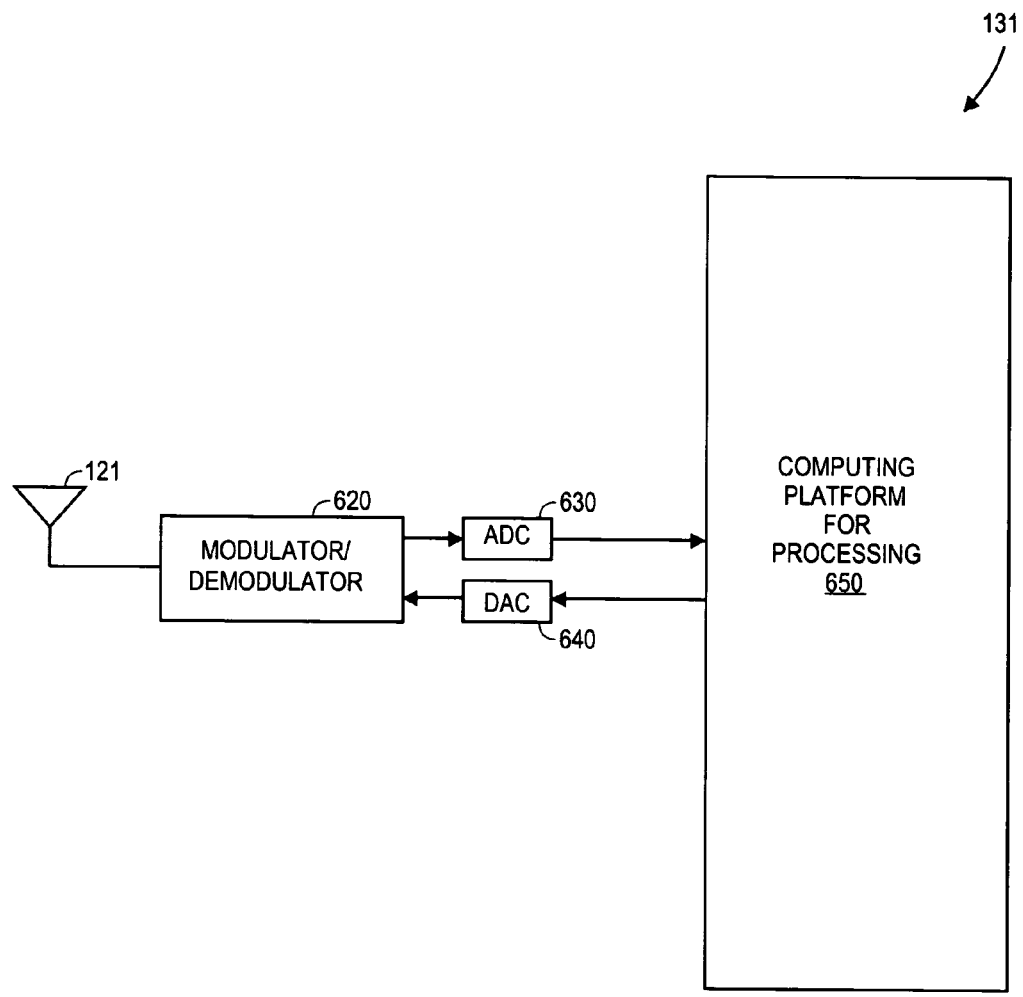
FIG. 6 shows a block diagram of a mobile device, according to an embodiment of the invention.

FIG. 6 shows a block diagram of a mobile device, according to an embodiment of the invention. The illustrated components of mobile device 131 may include a computing platform 650, antenna 121, modulator/demodulator 620, ADC 630, and DAC 640 that may be functionally similar to those similarly-named components of FIG. 5, but the device of FIG. 6 is shown with a single antenna/modulator/demodulator/ADC/DAC combination, and the computing platform 650 may perform the operations previously described for a mobile device rather than a base station, although various embodiments of the invention are not limited in these respects.

Figure 7:
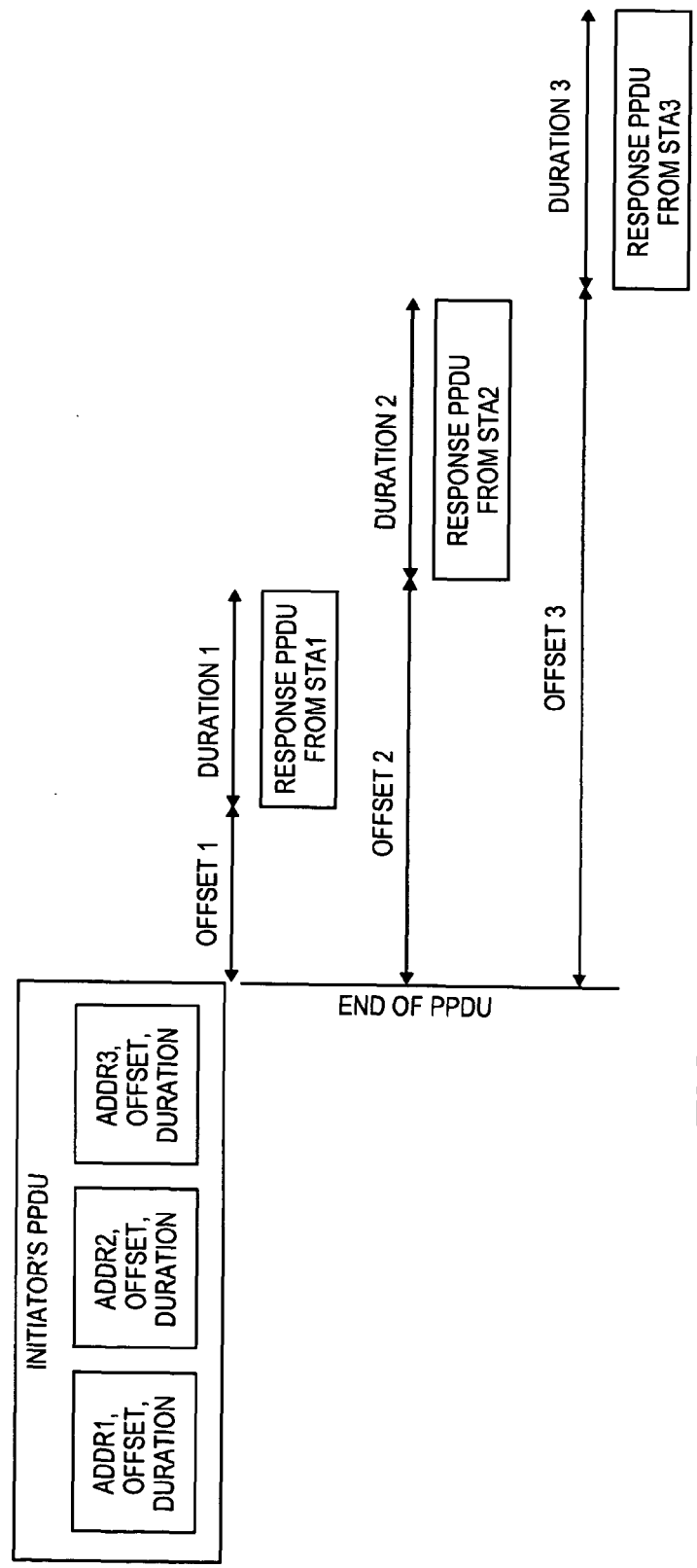
FIG. 7 shows a diagram of a communications sequence, according to an embodiment of the invention.

FIG. 7 shows a diagram of a communications sequence, according to an embodiment of the invention. In the illustrated embodiment, a wireless device (such as a base station, although some embodiments of the invention may not be limited in this respect) may make a transmission addressed to several STAs. Three STAs are shown, but the same principles may be used with any feasible number of STAs. The transmission may be in the form of a Physical layer convergence Protocol Data Unit (PPDU), although some embodiments of the invention may not be limited in this manner. The transmission may comprise multiple blocks, with each block addressed to specific STAs. Each block may be in the form of a Medium access control Protocol Data Unit (MPDU), although some embodiments of the invention may not be limited in this manner. In the illustrated embodiment, each block may comprise various information, such as 1) an address specifying which STA is being addressed, 2) an offset specifying how long after completion of the base station's transmission the STA should wait before beginning its response, and 3) a duration specifying how long the STA has to respond. Each offset and its associated duration, when combined, may be the equivalent of one of the time periods t1, t2, etc., shown in FIG. 2.

The base station may determine the offsets and durations to specify, using various criteria. For example, the first offset may be based on a determination of how long it might take the addressed STA to recognize it is being addressed and prepare itself for transmission, as well as a determination of how long it might take the base station to switch to a receive mode after completing its transmission. In some embodiments the first offset may be determined to have a minimum value of some predefined time period, such as a Short Interframe Space (SIFS). The first duration may be based on various criteria. For example, some embodiments may dictate that the addressed STA must terminate its response within the indicated duration time, even if it has addition data to send, while other embodiments may use other techniques (e.g., determining before the poll how much data the STA has to send and specifying a duration that will accommodate that amount of data). Other techniques may also be used.

The second offset may be based on the first offset and first duration. In some embodiments, the second offset may be equal to the first offset plus the first duration. Alternatively, the second offset may be equal to the sum of those two time periods plus additional time. Such additional time may be, for example, a defined delay between the end of the response from the first STA and the beginning of the response from the second STA, although various embodiments of the invention may not be limited in this manner. When included, such additional time may be determined in various ways, such as but not limited to the ability of the base station to switch from receiving data from one STA to receiving data from another STA. As before, the second duration may also be determined in various ways. In some embodiments, the time to switch between receiving data from different STAs may be less than the time to switch between transmitting and receiving.

In a similar manner, the third offset may comprise the second offset plus the second duration, and may possibly include additional time as well, while the third duration may be determined in various ways. These same techniques may be extended to include additional offsets and durations for additional STAs. In some embodiments the various offsets may be determined in different ways (e.g., some offsets may include additional time between responses while other do not), and/or the various durations may be determined in various ways (e.g., some STAs may be granted enough time to transmit all queued-up data, while others are limited to a defined response time without regard to how much data they have queued up to send). Some embodiments may use other factors to determine offsets.

The responses from the STAs may have various formats. For example, in some embodiments the response from a STA may comprise a PPDU, which may in turn comprise multiple MPDUs, but other embodiments may use other techniques.

The foregoing description is intended to be illustrative and not limiting. Variations may occur to those of skill in the art. Those variations are intended to be included in the various embodiments of the invention, which are limited only by the spirit and scope of the appended claims.

What is claimed is:

1. An apparatus, comprising
a first electronic device adapted to wirelessly transmit a multicast poll, the multicast poll comprising:
a first address of a second electronic device and a first time delay indicator indicating a first time delay for the second electronic device to wait before transmitting a first response, and
a second address of a third electronic device and a second time delay indicator indicating a second time delay for the third electronic device to wait before transmitting a second response,
wherein the first time delay indicator is exclusive to the second electronic device and the second time delay indicator is exclusive to the third electronic device, and wherein the first electronic device is further adapted to receive the first response and the second response at different times indicated by the first time delay indicator and the second time delay indicator.

2. The apparatus of claim 1, wherein the first time delay includes a delay between an end of the poll and a beginning of the first response.

3. The apparatus of claim 1, wherein the first electronic device is further adapted to create a poll group by assigning the first and second addresses to the poll group.

4. The apparatus of claim 1, wherein a difference between the first time delay and the second time delay is at least as great as a time for the second electronic device to transmit the first response.

5. The apparatus of claim 1, wherein the poll comprises a first block of data containing the first address and the first time delay indicator, and further comprises a second block of data containing the second address and the second time delay indicator.

6. The apparatus of claim 5, wherein the first and second blocks of data each have a format of a medium access control protocol data unit.

7. The apparatus of claim 1, further comprising multiple antennas, wherein the apparatus is adapted to transmit the poll from at least one of the antennas.

8. The apparatus of claim 1, wherein the apparatus comprises a base station.

9. An apparatus comprising
an electronic device adapted to:
receive a poll with multiple addresses including a particular address associated with the electronic device, the poll further including a time delay indicator associated with the particular address; and
wirelessly transmit a response to the poll subsequent to an expiration of a time delay indicated by the time delay indicator;
wherein the time delay indicator is exclusive to the particular address.

10. The apparatus of claim 9, wherein the poll comprises multiple blocks of data, with each block containing a different one of the multiple addresses.

11. The apparatus of claim 10, wherein each of the multiple blocks of data has a format of a medium access control protocol data unit.

12. The apparatus of claim 9, wherein the apparatus is a mobile wireless device.

13. The apparatus of claim 9, further comprising at least one antenna to transmit the response.

14. The apparatus of claim 9, further comprising at least one antenna to receive the poll.

15. A method, comprising: transmitting a poll addressed to multiple electronic devices, the poll containing timing indicators to specify a respective period of time each addressed electronic device should wait before transmitting a response, wherein the timing indicator for any one of the multiple electronic devices is different than the timing indicator for any of the remaining multiple electronic devices; and receiving a respective response from at least two of the multiple electronic devices, wherein each respective response is received at a different time as each other respective response is received based at least in part on the timing indicators.

16. The method of claim 15, wherein each of the timing indicators indicates a different amount of time.

17. The method of claim 15, further comprising determining a poll group for the poll prior to said transmitting, the poll group comprising the multiple addresses.

18. The method of claim 15, wherein the poll comprises data formatted as medium access control protocol data units.

19. The method of claim 18, wherein each medium access control protocol data unit comprises one of the device addresses and an associated one of the timing indicators.

20. A method, comprising:
receiving a multicast poll containing a particular identifier and also containing a time delay indicator associated with the particular identifier; and
transmitting a response to the multicast poll subsequent to a time delay indicated by the time delay indicator;
wherein the time delay indicator is exclusive to the particular identifier.

21. The method of claim 20, wherein said receiving comprises determining the particular time delay from the timing indicator.

22. The method of claim 21, wherein said receiving comprises determining a duration of time for said transmitting indicated by a duration indicator received in the multicast poll.

23. An article comprising a non-transitory computer readable medium on which are stored computer executable instructions, which when executed by a computing platform, cause said processing platform to perform operations comprising:
transmitting a multicast poll addressed to multiple electronic devices, the multicast poll containing a different time delay indicator for each of the multiple addresses; and
receiving a response from each of the multiple electronic devices, each of the responses being received at different times indicated by the time delay indicators.

24. The article of claim 23, wherein the multicast poll comprises multiple blocks of data, each block comprising one of the addresses and one of the associated time delay indicators.

25. The article of claim 24, wherein at least one block comprises a duration indicator indicating a length of time for an associated response.

* * * * *

UNITED STATES PATENT AND TRADEMARK OFFICE
CERTIFICATE OF CORRECTION

PATENT NO. : 8,699,508 B2
APPLICATION NO. : 10/969689
DATED : April 15, 2014
INVENTOR(S) : Adrian P. Stephens et al.

Page 1 of 1

It is certified that error appears in the above-identified patent and that said Letters Patent is hereby corrected as shown below:

On the Title Page

Item (57), in "Abstract", line 1, delete "station poll mobile devices" and insert -- station may poll multiple mobile devices --, therefor.

Signed and Sealed this
Twenty-second Day of July, 2014

Michelle K. Lee
*Deputy Director of the United States Patent and Trademark Office*